Sept. 27, 1949.  G. C. J. MOL  2,483,147
PHOTOGRAPHIC REPRODUCTION AND PROJECTION
DEVICE FOR CATHODE-RAY TUBE SCREENS
Filed July 20, 1946
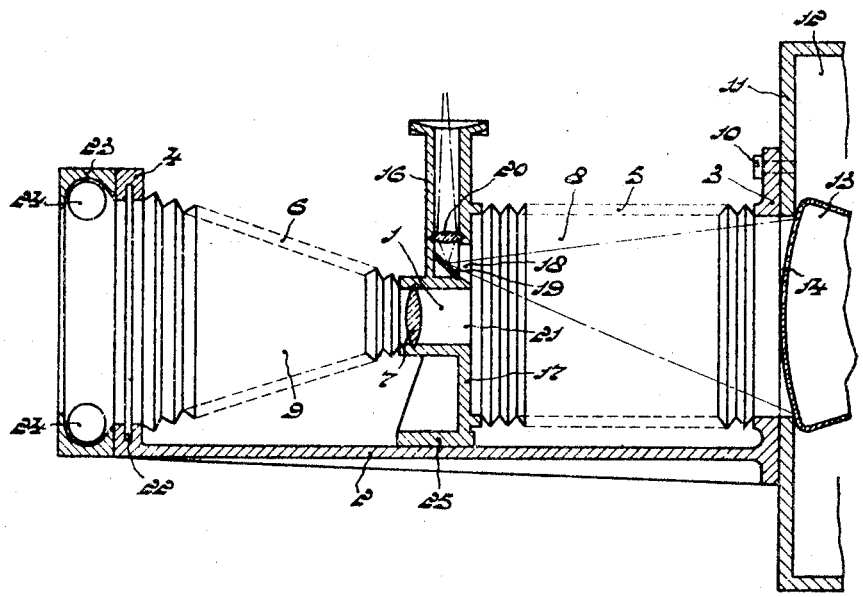
INVENTOR
GERARD CHRISTIAAN JAN MOL
AGENT

UNITED STATES PATENT OFFICE 2,483,147

PHOTOGRAPHIC REPRODUCTION AND PROJECTION DEVICE FOR CATHODE-RAY TUBE SCREENS

Gerard Christiaan Jan Mol, Eindhoven, Netherlands, assignor to Hartford National Bank and Trust Company, Hartford, Conn., as trustee Application July 20, 1946, Serial No. 685,172
In the Netherlands September 29, 1943

Section 1, Public Law 690, August 8, 1946
Patent expires September 29, 1963

1 Claim. (Cl. 346—110)

In order to obtain information from the screen-image of an electron-ray tube, particularly of an electron-ray oscillograph serving for registering oscillation phenomena, it is often desirable to compare the deflections of the luminous spot on the image screen of the tube to a given standard. For this purpose it is known to provide the screen with measuring lines establishing a system of coordinates or scale divisions. Such lines may be engraved in the bulb wall. In order to secure satisfactory visibility of these engravings when a flat screen is used, it has been proposed to arrange one or more light sources in the plane of the screen, the light of said sources following the direction of the glass wall. By reflection at the grooves, the latter become visible. At the same time, however, any irregularity in the constitution of the glass wall by which the luminous rays are refracted or reflected thus becomes visible. If the electron-ray tube is desired to be used for different purposes, it may be undesirable that the screen of the tube is permanently provided with such indications. Furthermore, the light of the luminous track formed by the electronic spot is subjected to a slight refraction in the grooves and this affects the definition of the image.

These disadvantages are avoided in a further well known device in which a scale division is projected on the image screen of the tube by means of luminous rays. In order that the device required for the projection may not be troublesome when viewing the image of the screen, it is arranged outside the cone of rays of the screen-image. The deformations of the screen-image thus occurring require the use of correcting means such as mirrors which, however, complicate the device.

It is often desired to take a photographic exposure of the screen-image of an electron-ray tube. In this case, use is made of an ordinary exposure camera and the intermediate space between the lens and the screen of the tube is enclosed by a light-tight cylinder so that external light rays can not affect the result of the exposure. This avoids the necessity of operating constantly in a darkened room.

The invention has for its object to provide a device of simple construction which permits projecting a scale division onto the image screen taking an exposure.

According to the invention, use is made of the objective of the photographic exposure apparatus for projecting a scale division onto the screen image surface. Consequently, the objective of the exposure apparatus is used for two purposes and this renders the device more simple than if a separate objective is used for projecting the scale division.

The device is preferably made in such manner that the support for the scale division to be projected is arranged during projection at the position occupied by the photographic plate (which is intended to include here a photographic film) during the exposure of the screen-image. This construction has the advantage that the adjustment of the objective to project the scale division on the image screen of the electron-ray tube in a sharply defined manner results in that the objective is thus positioned to form the screen image during exposure in a sharply defined manner on the photographic plate. The rather circuitous work of focusing the image on the photographic plate can thus be omitted, because it is already effected by focusing the scale division on the image screen, which can be done with great accuracy when using a light source of high luminous intensity for projection. At the same time, the advantage is obtained that the screen-image is reproduced in the same proportion as the scale division so that the proportions adjusted on the image-screen of the tube are also obtained in the photographic reproduction.

The light source required for projecting the scale division is arranged preferably adjacent the support of the image to be projected so that a compact arrangement is obtained. For this purpose, the holder of the light source of the projecting apparatus may be combined with the holder for this support to form a single unit.

When making the photographic exposure, the space between the objective of the camera and the image screen of the electron-ray tube must be surrounded by an envelope impervious to light. If this envelope is not to be removed during the projection of the scale division and the adjustment of the image on the screen of the tube, the envelope is provided with a viewing hole containing an optical system which projects a picture of the image screen of the tube.

The simultaneous photographing of a screen image and a scale division obtained by projecting on the wall of an electron-ray tube generally introduces difficulty since due to the projecting-light beam the comparatively light-feeble image of the screen of the tube does not bring about a sufficient effect of contrast on the photographic plate. It is, therefore, more efficient to photograph the screen image and the scale division separately. This may be done in a simple and reliable manner with the aid of a device according to the invention.

According to the invention, the following procedure may be adopted.

After the image of the scale division is adjusted in a sharply defined manner on the screen of the tube and the electron-ray tube is switched on, the image produced by the electron-ray is adjusted relative to the scale division, for example, by varying the voltages at the deflecting members of the tube. This permits, for example, ensuring that the largest dimension of the image has a definite value. Next, the projecting device is put out of action, the support of the scale division is replaced by the photographic plate, and the image of the electron-ray tube is photographed. After exposure of the screen image is completed, the negative and the scale division are printed in a superposed manner jointly on a photographic plate. The result thus obtained corresponds completely with the images on the image screen of the tube which may be reproduced on a larger or smaller scale without changing to any extent the ratio between the dimensions of the scale division and those of the screen image.

In order that it may be possible to make desired measurements, the projecting device may be adjusted in such a manner that the projection of the scale division on the screen of the tube is serviceable as a measuring scale, the lines of such a division being consequently spaced apart a readily reproduceable distance of, for example, 1 cm. In this case, it is immaterial how the dimensions of the division scale are actually, because the proportions are maintained in the photographic picture. A simple arrangement is obtained if use is made of a millimeter scale and if the projection device produces an unreduced image.

In order that the invention may be clearly understood and readily carried into effect, it will now be set out more fully with reference to the accompanying drawing, in which one embodiment is illustrated by way of example.

A slidable lens holder 1 is arranged on a supporting surface 2 and connected by light-tight envelopes 5 and 6 to two walls 3 and 4. These envelopes may be constructed as the bellows of an ordinary camera and prevent external light from entering into the projection chamber. This chamber is divided in two by a lens 7; the part 8 will be referred to as the object space, the other part 9 as the image space. By means of screws 10 that enter holes in the wall 3, the device is fixed to the wall 11 of a housing 12 which contains an electron-ray tube 13. Referring to the latter, only the terminal surface 14 is shown which is made of transparent material and which acts as the image surface. On its inner side, the surface is coated with a film of fluorescent substance which converts the energy that is set free when the surface is struck by rapid electrons into visible light. Care must be taken that external light is prevented from penetrating into the object space along the front surface of the tube and the attachment of the device to the housing must also be impervious to light.

In order to observe the image screen, the holder 1 of the lens 7 has connected to its a cylindrical member 16 which may form part of the closing plate 17 of the object space. This plate comprises an aperture 18 which communicates with the interior of the cylinder 16. By providing a slanting mirror 19, luminous rays emitted by the image screen 14 are reflected in the direction of the aperture of the cylinder. They are focused by means of a lens 20, so that a reduced image of the image screen is produced at the area of the eye of the observer.

The closing plate 17 comprises a second aperture 21 which also constitutes a passage for the luminous rays of the image screen. This passage contains the lens 7 which constitutes the separation between the object space and the image space. The latter space is closed by the wall 4 which comprises an aperture behind which may be arranged a photographic plate which is slidable in a groove 22 of the wall 4 and which can be inserted through a slit in the wall.

The place of the photographic plate may also be occupied by a division scale; such a scale may consist of a flat glass plate provided with a scale division whose lines may be applied to the glass plate by etching, engraving or by photographic means, care being taken that the transparency differs from that of the remaining plate surface. The support may be transparent, whereas the scale division is rendered visible as light-absorbing lines. As an alternative, the support may be opaque and only transparent at the area of the the division lines.

On the side of the wall 4 remote from the lens 7, there is arranged a lighting member constituted by a holder 23 for two illuminating lamps 24 which light up the surface of the division scale. It is advisable to apply the scale division to a frosted surface, so that it transmits a diffuse radiation. A picture of the scale division is projected by the lens 7 onto the screen of the tube and can be adjusted in a sharply defined manner by shifting the lens holder which, for this purpose, is provided with a foot 25 adapted to be moved along the supporting surface 2. The image is viewed by putting the eye in front of the aperture of the cylinder 16. After the correct adjustment is obtained, the image produced on the screen of the tube by the electron-rays may be adjusted relatively to the projected scale division. If an exposure of the screen image is then desired, a photographic plate needs only to be substituted for the division scale, after which the apparatus is ready to take the exposure. There is no need for changing the adjustment of the lens to any extent since with the adjustment required for obtaining a sharply defined image of the scale division on the screen, the image of the screen is conversely projected in a sharply defined manner at the area of the division scale which is the same as was occupied by the photographic plate. After the exposure is completed and the photographic plate is developed, the photographic negative so produced may be printed jointly with the division scale, after which a photographic reproduction of the image of the screen is obtained which is provided with the scale division in agreement with the image that presented itself to the eye of the observer. The aperture for viewing the image of the screen is covered during the exposure, in order to avoid the entrance of undesired light rays.

What I claim is:

A projection and photographic device comprising a first casing having an aperture therein, a cathode ray tube having a screen mounted in said first casing with said screen directed towards said aperture, a support mounted at an end thereof on said casing and extending therefrom, a second casing mounted on said support at a point remote from said end, said first casing having the aperture therein together with said support and said second casing thereon so constructed and arranged that said second casing faces the aperture in said first casing, a lens holder movably mounted on said support between said screen and said second casing for movement towards and away from said screen, an objective lens mounted on said movable lens holder and having the two surfaces thereof directed towards said screen and said second casing respectively, a viewing device mounted on said movable lens holder, said viewing device having at least one aperture directed towards said screen and at least another aperture adapted to be viewed by an operator of the device, holder means in said second casing for alternative use as a holder for a photographic plate or as a holder for a scale division plate through which light may pass to said screen, means in said second casing for mounting a light source behind said holder means whereby the image of a scale division plate placed in said holder means may be projected through said objective lens onto said screen, a first light impervious collapsible envelope means surrounding the space between said aperture in said first casing and said objective lens, and a second light impervious collapsible envelope means surrounding the space between said holder means in said second casing and said objective lens.

GERARD CHRISTIAAN JAN MOL.

REFERENCES CITED

The following references are of record in the file of this patent:

UNITED STATES PATENTS

| Number | Name | Date |
|---|---|---|
| 1,054,598 | Muller | Feb. 25, 1913 |
| 1,379,905 | Down | May 31, 1921 |
| 1,716,768 | Edmunds | June 11, 1929 |
| 1,930,431 | Barnack | Oct. 10, 1933 |
| 2,086,546 | George | July 13, 1937 |
| 2,166,440 | Jones | July 18, 1939 |
| 2,186,268 | Pakala | Jan. 9, 1940 |